US011074590B2

(12) United States Patent
Lim et al.

(10) Patent No.: US 11,074,590 B2
(45) Date of Patent: Jul. 27, 2021

(54) MANAGEMENT SERVER, CARD AUTHORIZATION TERMINAL, AND METHODS OF PROCESSING A CARD IN THE MANAGEMENT SERVER AND THE CARD AUTHORIZATION TERMINAL

(71) Applicant: LG CNS CO., LTD., Seoul (KR)

(72) Inventors: Il Woo Lim, Seoul (KR); Boohyeon Jeon, Seoul (KR)

(73) Assignee: LG CNS CO., LTD., Seoul (KR)

( * ) Notice: Subject to any disclaimer, the term of this patent is extended or adjusted under 35 U.S.C. 154(b) by 991 days.

(21) Appl. No.: 14/601,185

(22) Filed: Jan. 20, 2015

(65) Prior Publication Data

US 2016/0210629 A1 Jul. 21, 2016

(30) Foreign Application Priority Data

Jan. 19, 2015 (KR) ........................ 10-2015-0008698

(51) Int. Cl.
*G06Q 20/40* (2012.01)
*G06Q 20/14* (2012.01)
*G06Q 20/34* (2012.01)

(52) U.S. Cl.
CPC ........... *G06Q 20/409* (2013.01); *G06Q 20/14* (2013.01); *G06Q 20/34* (2013.01)

(58) Field of Classification Search
CPC ....... G06Q 20/409; G06Q 20/14; G06Q 20/34
See application file for complete search history.

(56) References Cited

U.S. PATENT DOCUMENTS

| 2002/0161729 | A1* | 10/2002 | Andrews | G06Q 20/363 705/417 |
| 2008/0010104 | A1* | 1/2008 | Williamson | G06Q 10/02 705/5 |
| 2009/0144202 | A1* | 6/2009 | Hurry | G06Q 20/085 705/67 |
| 2014/0207538 | A1* | 7/2014 | Jin | G07F 11/002 705/13 |

FOREIGN PATENT DOCUMENTS

| KR | 10-2009-0019493 A | | 2/2009 | |
| KR | 20120107683 A | * | 3/2011 | ............. G06Q 20/28 |
| KR | 10-1158879 B1 | | 6/2012 | |
| WO | WO2006124808 A2 | * | 11/2006 | |

OTHER PUBLICATIONS

"Travis, One Mile at a Time, Sep. 10, 2014, https://onemileatatime.com/flying-lap-children/, p. 3-4" (Year: 2014).*
Elaine Kelly, A Ticket to Ride: Does Free Bus Travel Promote Active Ageing?, 2011, p. 1-3 (Year: 2011).*

* cited by examiner

*Primary Examiner* — Kevin H Flynn
*Assistant Examiner* — Ibrahim N El-Bathy

(57) ABSTRACT

A card authorization method of a management server includes receiving first attribute information corresponding to a unique card number of a card from a card issuer server, extracting second attribute information corresponding to the unique card number of the card from a database, comparing the second attribute information with the first attribute information, generating fare information for billing to the card based on the comparison result, and transmitting the fare information to a card authorization terminal.

11 Claims, 9 Drawing Sheets

MANAGEMENT SERVER, CARD AUTHORIZATION TERMINAL, AND METHODS OF PROCESSING A CARD IN THE MANAGEMENT SERVER AND THE CARD AUTHORIZATION TERMINAL

CROSS-REFERENCE TO RELATED APPLICATIONS

The present application claims priority to Korean Patent Application No. 10-2015-0008698 filed on Jan. 19, 2015, the disclosure of which is hereby incorporated by reference in its entirety.

TECHNICAL FIELD

Embodiments of the present disclosure relate to a management server, a card authorization terminal, and methods of processing a card in the management server and the card authorization terminal.

BACKGROUND

A card authorization system authorizes the use of a card and charges a corresponding fee. In the case of a transportation card, it is possible to charge a fare differentiated according to various card types, such as a general card for adults and a teenager card, or to restrict the use of a card.

The card authorization system may continuously manage a change in attribute information corresponding to a card number or a unique number of a card so as to charge fares differentiated according to a variety of attribute information.

A large storage area is required in a case where the card authorization system stores and manages all attribute information corresponding to the total number of issued cards.

SUMMARY

Embodiments of the present disclosure have been made in an effort to reduce the amount of fare information that is generated for billing to a card.

In addition, embodiments of the present disclosure have been made in an effort to more rapidly apply a fare that changes according to a change in personal information of users.

Furthermore, embodiments of the present disclosure have been made in an effort to reduce the storage space used to store fare information by reducing the amount of fare information, and improve a transmission speed of the fare information.

A card authorization method of a management server includes: receiving first attribute information corresponding to a unique card number of a card from a card issuer server; extracting second attribute information corresponding to the unique card number of the card from a database; comparing the second attribute information with the first attribute information; generating fare information for billing to the card based on the comparison result; and transmitting the fare information to a card authorization terminal.

Generating the fare information may include, if a level of a ticket type of the first attribute information is higher than a level of a ticket type of the second attribute information, generating the fare information based on the ticket type of the first attribute information.

If a level of a ticket type of the first attribute information is lower than or equal to a level of a ticket type of the second attribute information, the fare information may not be generated.

The fare information and the unique card number may be stored in a card information table.

The card authorization method may further include: receiving the unique card number from the card authorization terminal; determining whether or not there is fare information corresponding to the unique card number; performing billing to the card based on one of said fare information and third attribute information stored in the card according to a result of the determination; and transmitting the billing result to the card authorization terminal.

Performing the billing to the card may include: performing the billing to the card based on the third attribute information if there is no fare information corresponding to the unique card number; and performing the billing to the card based on the fare information if there is the fare information.

Performing the billing to the card based on the fare information may include: requesting the card authorization terminal to change the third attribute information based on the fare information; receiving information on the change of the third attribute information from the card authorization terminal; and updating the second attribute information of the card that is stored in the database based on the information on the change of the third attribute information.

The second attribute information may include at least one of an unusable card type, a general ticket type, a teenager ticket type, and a children ticket type.

A card authorization method of a card authorization terminal includes: extracting a unique card number from a card when the card is tagged on the card authorization terminal; determining whether or not there is fare information corresponding to the unique card number of the card, the fare information being received from a management server; and performing billing to the card based on one of the fare information corresponding to the unique card number and third attribute information stored in the card, based on the determination result.

The fare information corresponding to the unique card number may be generated based on a result of comparing first attribute information with second attribute information, the first attribute information corresponding to the unique card number and being received from a card issuer server, the second attribute information corresponding to the unique card number and being stored in a database of the management server.

Performing the billing to the card may include: performing the billing to the card based on the third attribute information if there is no fare information corresponding to the unique card number; and performing the billing to the card based on the fare information if there is the fare information corresponding to the unique card number.

Performing the billing to the card based on the fare information may include: changing the third attribute information based on the fare information; and transmitting the changed third attribute information to the management server.

A management server includes: a communication device configured to receive first attribute information corresponding to a unique card number of a card from a card issuer server; a storage device configured to store second attribute information corresponding to the unique card number of the card; and a processor configured to compare the second attribute information of the card, which is extracted from the storage device, with the first attribute information, and generate fare information for billing to the card based on the comparison result.

If a level of a ticket type of the first attribute information is higher than a level of a ticket type of the second attribute information, the processor may generate the fare information based on the ticket type of the first attribute information, and, if the level of the ticket type of the first attribute information is lower than or equal to the level of the ticket type of the second attribute information, the processor may not generate the fare information.

The communication device may transmit the fare information to a card authorization terminal and then receive changed third attribute information of the card from the card authorization terminal, and the processor may update the second attribute information of the card that is stored in the storage device based on the changed third attribute information.

A card authorization terminal includes: a recognition device configured to recognize the tagging of a card; a storage device configured to store fare information that is generated based on a result of comparing first attribute information with second attribute information, the first attribute information corresponding to a unique card number of the card and being received from a card issuer server, the second attribute information corresponding to the unique card number and being stored in a database of a management server; and a processor configured to extract the unique card number from the card when the tagging of the card is recognized, and perform billing to the card based on one of the fare information and third attribute information stored in the card according to whether or not the fare information corresponding to the unique card number of the card is stored in the storage device.

If the fare information corresponding to the unique card number is not stored in the storage device, the processor may perform the billing based on the third attribute information of the card, and if the fare information corresponding to the unique card number is stored in the storage device, the processor may perform the billing based on the fare information.

The processor may change the third attribute information of the card based on the fare information, and the card authorization terminal may further include a communication device configured to transmit the changed third attribute information to the management server.

According to embodiments of the present disclosure, the amount of fare information can be reduced by generating fare information for billing to a card only when a level of a ticket type in first attribute information of the card is higher than a level of a ticket type in second attribute information of the card.

According to embodiments of the present disclosure, since a card authorization terminal directly changes third attribute information stored in a card and performs the charging and billing, it is possible to apply a fare more rapidly, even when the fare changes according to a change in the personal information of a user.

According to embodiments of the present disclosure, it is possible to reduce the storage space used to store fare information by reducing the amount of the fare information and improve a transmission speed of the fare information.

DESCRIPTION OF EMBODIMENTS

Figure 1:
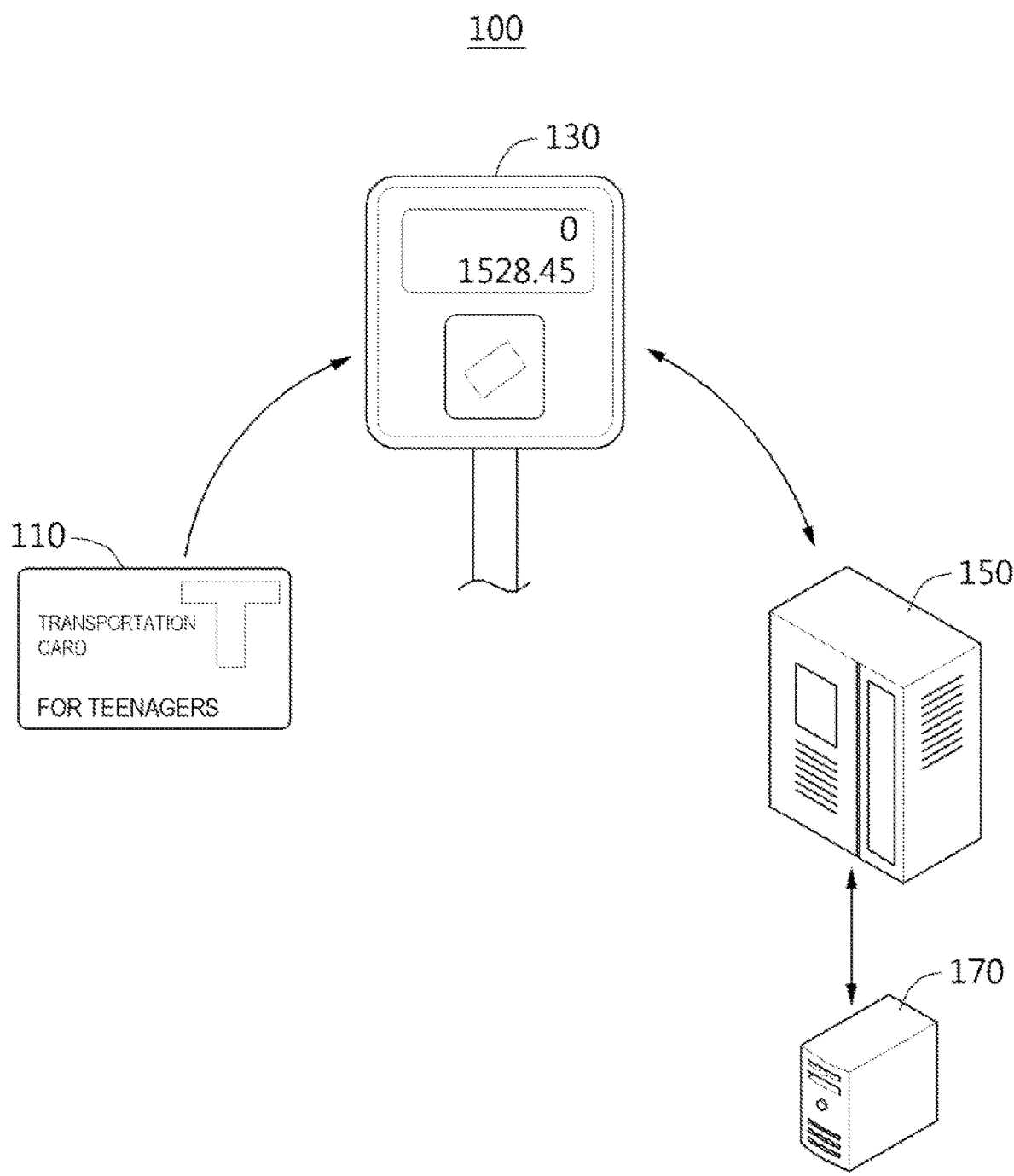
FIG. 1 illustrates a card authorization system according to an embodiment.

Hereafter, embodiments of the present disclosure will be described with reference to the accompanying drawings.

The following embodiments may be modified in various manners. Thus, the present disclosure should not be construed as limiting, but instead, embodiments should be construed to include all modifications, equivalents or substitutes thereof.

The terms used in the present disclosure are used for explaining specific embodiments, and do not limit embodiments. Terms in a singular form may include plural forms unless the contrary is indicated. In this specification, it should be understood that the meaning of "include/comprise" or "have" specifies a property, a figure, a step, a process, an element, a component, or a combination thereof which is described in the specification, without excluding one or more other properties, numbers, steps, processes, elements, components, or combinations thereof.

Terms used herein that are technical or scientific terms have the same meanings as the terms which are generally understood by those skilled in the art to which the present disclosure pertains, unless they are differently defined herein. Terms defined in a generally used dictionary may be interpreted to have meanings which coincide with contextual meanings in the related art. If terms are not clearly defined in this specification, they may not be interpreted as ideal or excessively formal or technical meanings.

In the accompanying drawings, like reference numerals refer to like elements, and duplicate descriptions thereof may be omitted. In the present disclosure, detailed descriptions related to well-known functions or configurations may be omitted so that the subject matter of the present disclosure is not unnecessarily obscured.

FIG. 1 illustrates a card authorization system according to an embodiment.

Referring to FIG. 1, the card authorization system 100 includes a card 110, a card authorization terminal 130, and a management server 150. The card authorization system 100 may further include a card issuer server 170.

The card 110 may perform billing for public transportation such as a bus, a taxi, or a subway. Examples of the card 110 may include a transportation-dedicated card, a credit card, a check card, and the like.

The card 110 may be differently marked according to various ticket types such as a general ticket type for adults, a teenager ticket type, and a children ticket type. The card 110 may store therein third attribute information depending on its own ticket type. The third attribute information stored in the card 110 may be changed by the card authorization terminal 130. For example, the card authorization terminal 130 may extract a unique identifier (e.g., a unique card number) of the card 110 when the card 110 is tagged thereon.

The card authorization terminal 130 may extract the unique card number from the card 110, and transmit the extracted unique card number to the management server 150 to request the management server 150 to authorize the use of the card 110 for the charging and billing to the card 110.

Various embodiments for the card authorization terminal 130, which requests the management server 150 to authorize the use of the card 110 by transmitting the unique card number to the management server 150 and performs charging and billing to the card 110 based on fare information received from the management server 150, will be described with reference to FIGS. 2 to 4.

According to some other embodiments, the card authorization terminal 130 may directly perform authorization for the charging and billing to the card 110.

The card authorization terminal 130 may directly perform the charging and billing to the card 110 based on one of fare information and third attribute information stored in the card 110 according to whether or not the fare information corresponding to the unique card number of the card 110 is stored in a card information table within the card authorization terminal 130. The card information table may store any of a unique card number and attribute information or fare information corresponding to the unique card number.

For example, if, when authorizing the card 110, the fare information corresponding to the unique card number of the card 110 is not stored in a card information table that stores fare information downloaded from the management server 150, the card authorization terminal 130 may perform billing based on the third attribute information stored in the card 110, which may include, for example, one of a general ticket type, a teenager ticket type, a children ticket type, and the like. The card authorization terminal 130 may bill the card 110 for a discounted fare or an undiscounted fare according to the third attribute information stored in the card 110.

Regarding the third attribute information, it can be understood that the general ticket type corresponds to the highest level ticket type, the teenager ticket type corresponds to the second-highest level ticket type, and the children ticket type corresponds to the lowest level ticket type. In addition, the third attribute information may include information relating to any one of various categories that can classify fares. The third attribute information may include a variety of fare classification information that may include, but is not limited to, age, gender, purchase time, seasons, and day of the week. Hereinafter, a level of a ticket type will be referred to as 'ticket type level.'

Various embodiments for the card authorization terminal 130 directly performing authorization for charging and billing will be described with reference to FIGS. 5 to 8.

When the fare information of the card 110 exists in the card information table, the card authorization terminal 130 may perform billing based on the fare information of the card 110. The fare information may be generated by the management server 150 based on a result of comparing first attribute information, which corresponds to the unique card number of the card 110 and is received by the management server 150 from the card issuer server 170, and second attribute information, which corresponds to the unique card number of the card 110 and is stored in a database of the management server 150.

The first attribute information may include information updated by the card issuer server 170, such as information on a ticket type corresponding to the unique card number of the card 110. The ticket type of the card 110 included in the first attribute information may be updated according to a change in personal information of a user of the card 110.

The management server 150 may receive the unique card number of the card 110 from the card authorization terminal 130 and transmit fare information on the card 110 to the card authorization terminal 130. The card authorization terminal 130 may perform billing to the card 110 based on the received fare information and transmit the billing result to the management server 150.

In order to correctly control authorization and charge the correct fare according to the first attribute information, which corresponds to the unique card number of the card 110 and is received from the card issuer server 170, or the second attribute information, which corresponds to the unique card number of the card 110 and is extracted from the database of the management server 150, the management server 150 may continuously manage a change in the second attribute information corresponding to the unique card number of the card 110 or the unique card number of the card 110.

In order to continuously manage the change in the second attribute information, the management server 150 may generate fare information or discount information for charging and billing to the card 110 and transmit the generated fare information or discount information to the card authorization terminal 130. Herein, the fare information or discount information may reflect the change in the second attribute information. To generate the fare information or discount information, the management server 150 may compare the second attribute information of the card 110 with the first attribute information corresponding to the unique card number of the card 110. As a result of the comparison, if a ticket type level of the first attribute information is equal to or lower than a ticket type level of the second attribute information of the card 110, the management server 150 may not generate fare information to reduce the size of fare information to be transmitted to the card authorization terminal 130.

In an embodiment, the management server 150 may include a card information table, which stores the unique card number and the fare information, in a database.

In addition, the management server 150 may include a database storing information of a card issuance ledger, which corresponds to initial information generated at the time of issuing the card 110. In another embodiment, the database may be present outside of the management server 150.

The management server 150 may receive changed third attribute information of the card 110 from the card authorization terminal 130 and update the second attribute information of the card 110 that is stored in the database based on the changed third attribute information.

The card issuer server 170 may transmit the first attribute information corresponding to the unique card number of the card 110 to the management server 150.

According to embodiments, the management server 150 and the card issuer server 170 may be implemented in a single server, or may be separate from each other as illustrated in FIG. 1.

Figure 2:
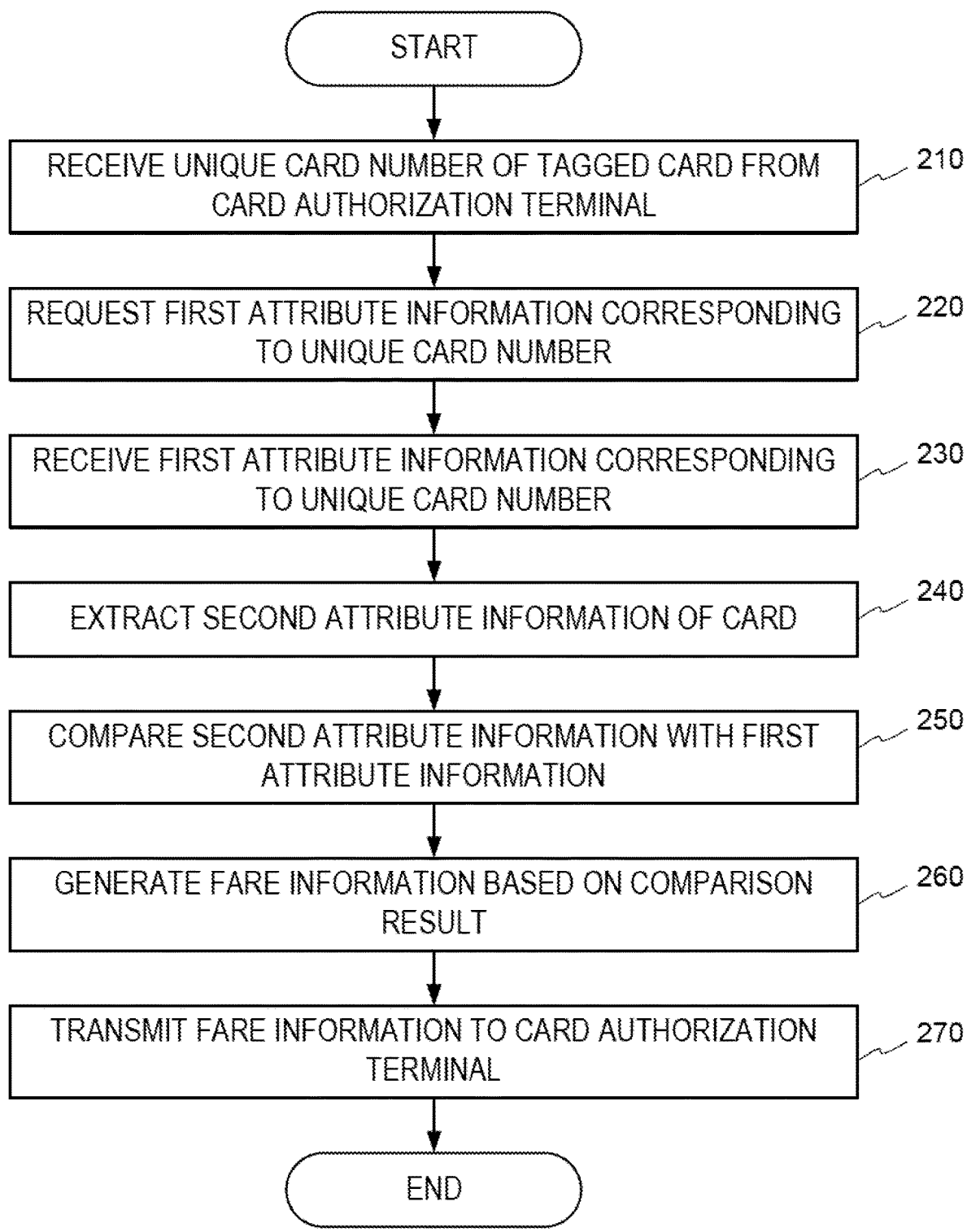
FIG. 2 is a flowchart illustrating a method of performing card authorization in a management server according to an embodiment.

FIG. 2 is a flowchart illustrating a method of performing card authorization in a management server according to an embodiment.

Referring to FIG. 2, at step 210, the management server may receive a unique card number of a tagged card from a card authorization terminal.

At step 220, the management server may request a card issuer server to send first attribute information corresponding to the unique card number of the card. At step 230, the management server may receive the first attribute information corresponding to the unique card number of the card from the card issuer server.

At step 240, the management server may extract second attribute information of the card from a database that stores information of a card issuance ledger. In some embodiments, the database may be employed in the management server, or may be present separately, outside of the management server. The second attribute information may include at least one of an unusable card type, a general ticket type, a teenager ticket type, and a children ticket type. In addition, the second attribute information may include information on any one of various categories that can differentiate fares. The second attribute information may include a variety of fare classification information including, but not limited to, age, gender, purchase time, seasons, and day of the week.

At step 250, the management server compares the extracted second attribute information with the first attribute information received from the card issuer server.

At step 260, the management server generates fare information for billing to the card, based on the comparison result.

At step 270, the management server may transmit the generated fare information to the card authorization terminal. The card authorization terminal may perform billing to the card based on the fare information received from the management server. In addition, the card authorization terminal may update a card information table therein using the fare information received from the management server.

Figure 3:
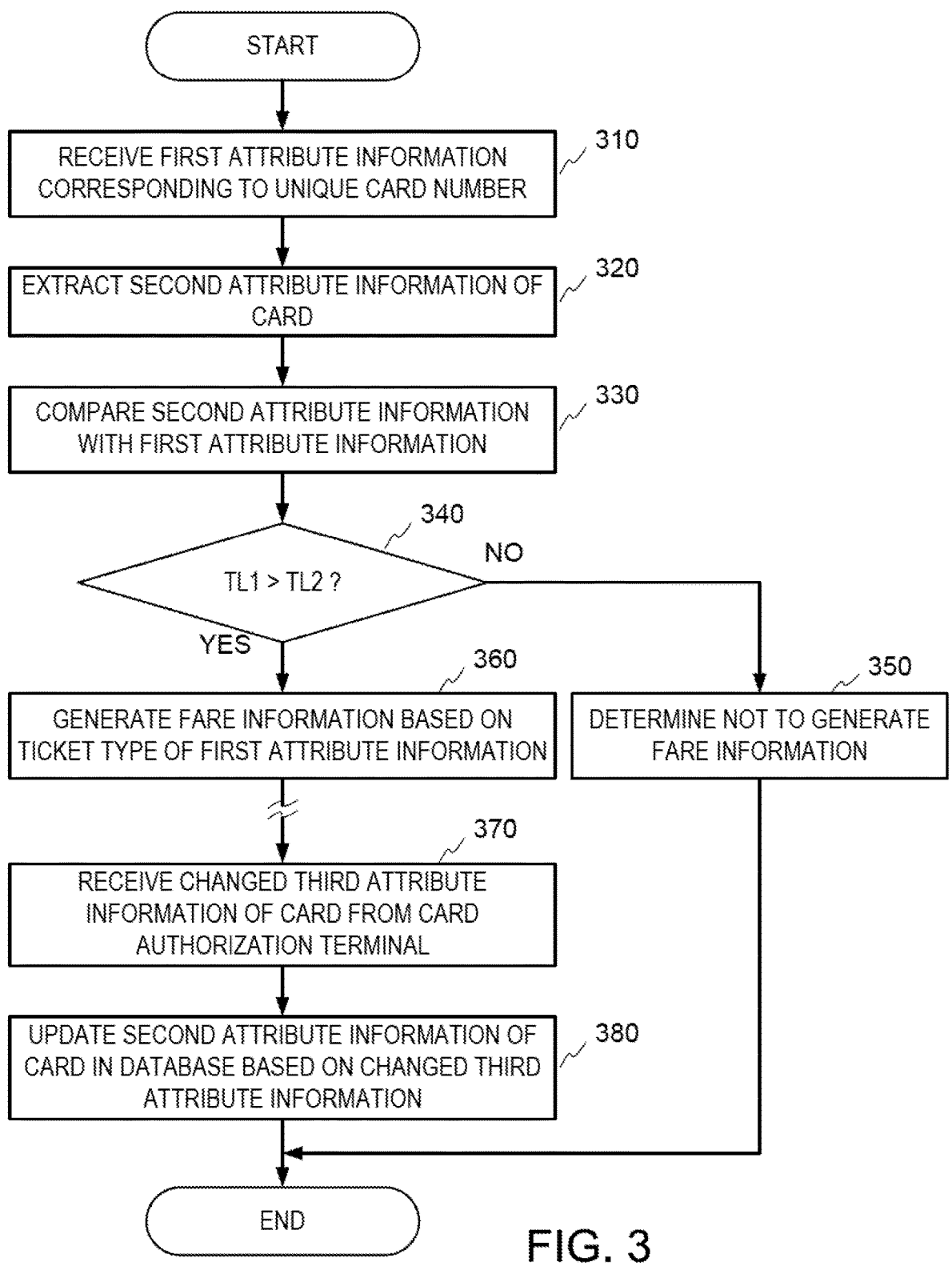
FIG. 3 is a flowchart illustrating a method of performing card authorization in a management server according to another embodiment.

FIG. 3 is a flowchart illustrating a method of performing card authorization in a management server according to another embodiment.

Referring to FIG. 3, if a unique card number of a card is received from a card authorization terminal after the card is tagged, at step 310, the management server receives first attribute information corresponding to the unique card number from a card issuer server.

At step 320, the management server extracts second attribute information of the card from a database that stores information of a card issuance ledger. The second attribute information may include any one of a general ticket type, a teenager ticket type, and a children ticket type.

At step 330, the management server compares the extracted second attribute information with the first attribute information received from the card issuer server.

At step 340, the management server determines if a ticket type level TL1 of the first attribute information is higher than a ticket type level TL2 of the second attribute information, based on the comparison result of step 330.

If it is determined that the ticket type level TL1 of the first attribute information is equal to or lower than the ticket type level TL2 of the second attribute information, the management server may determine not to generate any fare information at step 350. In an embodiment, the ticket type in the first attribute information may be any one of a general ticket type (adult ticket type), a teenager ticket type, a children ticket type, a senior citizen ticket type, and an unusable card type.

For example, when the ticket type in the first attribute information is a teenager ticket type and the second attribute information of the card includes a teenager ticket type or a general ticket type, the management server does not consider the ticket type (teenager ticket type) of the first attribute information of the card as a target for generating fare information. That is, if the ticket type level (teenager ticket type) of the first attribute information is equal to or lower than the ticket type level (teenager ticket type or general ticket type) of the second attribute information, the management server does not generate any fare information. This is because, when a teenager purchases and uses a general ticket type card, billing for a general fare can be performed without applying a discounted fare for teenagers.

On the other hand, if, as the comparison result of step 330, it is determined that the ticket type level TL1 of the first attribute information is higher than the ticket type level TL2 of the second attribute information, the management server may generate fare information based on the ticket type of the first attribute information at step 360.

For example, when the ticket type of the first attribute information is a general ticket type and the second attribute information of the card includes a teenager ticket type, the management server may generate fare information based on the ticket type (general ticket type) of the first attribute information. This is because, when a user of the card grows from a teenager into an adult with the lapse of time after the user purchased the teenager ticket type card, while a ticket type corresponding to the user has been changed in the first attribute information corresponding to the unique card number of the card received from the card issuer server, the second attribute information of the card may maintain the initial ticket type, i.e., the teenager ticket type.

In this case, the management server may generate the fare information for billing to the card so as to apply a changed fare according to the change in personal information of the user.

Cases where the ticket type level TL1 of the first attribute information is higher than the ticket type level TL2 of the second attribute information of the card, in accordance with embodiments as described above, are summarized in Table 1 below.

When the result of comparison between the second attribute information and the first attribute information corresponds to "○" in Table 1 below, fare information for billing to the card may be generated.

TABLE 1

| | | Ticket Type of First Attribute Information | | |
|---|---|---|---|---|
| Classification | | General | Teenagers | Children |
| Ticket Type of Second Attribute Information | General | X | X | X |
| | Teenagers | ○ | X | X |
| | Children | ○ | ○ | X |

According to embodiments, the generated fare information is transmitted to the card authorization terminal, and the card authorization terminal changes third attribute information stored in the card based on the fare information. If the third attribute information of the card is changed by the card authorization terminal, the management server may receive the changed third attribute information of the card from the card authorization terminal at step 370. At step 380, the management server may update the second attribute information of the card that is stored in the database based on the changed third attribute information received from the card authorization terminal.

Figure 4:
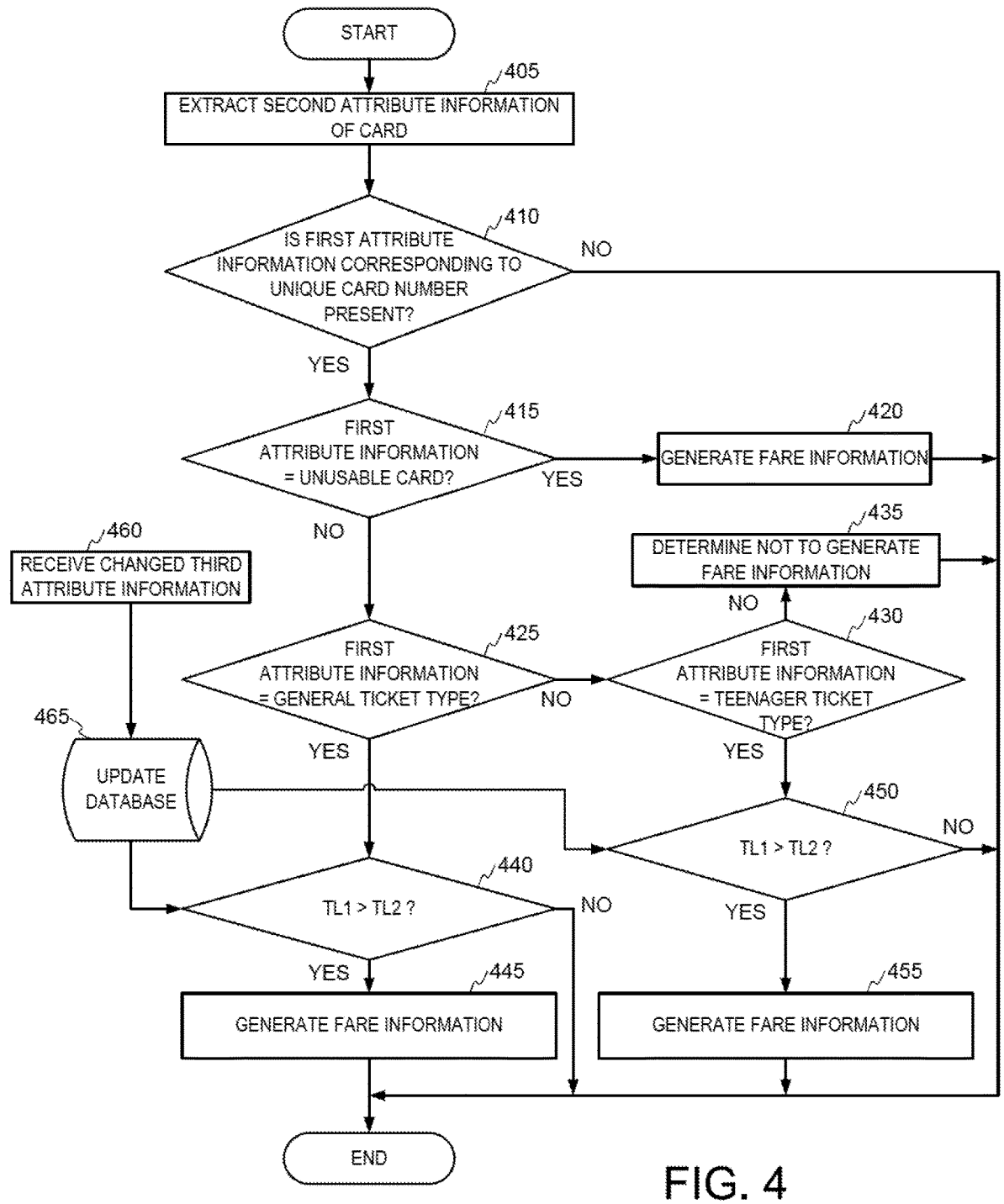
FIG. 4 is a flowchart illustrating a method of performing card authorization in a management server according to still another embodiment.

FIG. 4 is a flowchart illustrating a method of performing card authorization in a management server according to still another embodiment.

Referring to FIG. 4, if a unique card number of a card is received from a card authorization terminal after the card is tagged, at step 405, a management server may extract second attribute information of the card from a database that stores information of a card issuance ledger.

At step 410, the management server may determine whether or not first attribute information corresponding to the unique card number of the card is present in its own storage device. In an embodiment, the first attribute information may be information that is received from a card issuer server and stored in the storage device such as a memory or the like, of the management server.

If, as the determination result of step 410, it is determined that the first attribute information is not present in the storage device of the management server, the management server may end the process.

On the other hand, if it is determined that the first attribute information is present in the storage device at step 410, the management server may determine if the first attribute information corresponds to an unusable card at step 415.

If it is determined that the first attribute information corresponds to the unusable card, the management server may generate fare information at step 420. Herein, the unusable card may be a card that has been reported stolen or missing, or a card that cannot perform a payment function, such as a card having a lower balance than a billed fare.

The fare information generated at step 420 may include an indicator or a mark indicating that the card corresponds to the unusable card, or information representing a reason why the card cannot perform payment. The fare information generated at step 420 may be transmitted to a card authorization terminal and used for preventing the use of the card.

On the other hand, if it is determined that the first attribute information does not correspond to an unusable card at step 415, the management server may determine if the first attribute information corresponds to a general ticket type at step 425.

If it is determined that the first attribute information corresponds to the general ticket type, the management server may determine whether or not a ticket type level TL1 of the first attribute information is higher than a ticket type level TL2 of the second attribute information of the card at step 440.

As the determination result of step 440, if it is determined that the ticket type level TL1 of the first attribute information is not higher than the ticket type level TL2 of the second attribute information, the management server may end the process.

On the other hand, if it is determined that the ticket type level TL1 of the first attribute information is higher than the ticket type level TL2 of the second attribute information, the management server may generate fare information at step 445.

Meanwhile, if it is determined that the first attribute information does not correspond to the general ticket type at step 425, the management server may determine if the first attribute information corresponds to a teenager ticket type at step 430.

If it is determined that the first attribute information corresponds to the teenager ticket type, the management server may determine whether or not the ticket type level TL1 of the first attribute information is higher than the ticket type level TL2 of the second attribute information at step 450.

If it is determined that the ticket type level TL1 of the first attribute information is not higher than the ticket type level TL2 of the second attribute information, the management server may end the process.

On the other hand, if it is determined that the ticket level TL1 of the first attribute information is higher than the ticket type level TL2 of the second attribute information, the management server may generate fare information at step 455.

If it is determined that the first attribute information does not correspond to the teenager ticket type at step 430, the management server may determine not to generate any fare information at step 435, and end the process. At this time, the management server determines not to generate fare information because the first attribute information is determined to correspond to a children ticket type as the result of step 430, which is the lowest level. That is, since the ticket type of the first attribute information is a children ticket type and the lowest level, the second attribute information of the card may include a ticket type having a level higher than or equal to a level of the children ticket type, and thus, fare information is not generated. The generated fare information is transmitted to the card authorization terminal.

Thereafter, at steps 460 and 465, the management server may receive changed third attribute information of the card from the card authorization terminal and update the second attribute information of the card that is stored in the database, based on the changed third attribute information.

In the above embodiments described with reference to FIGS. 2 to 4, if the fare information is generated by a management server and transmitted to a card authorization terminal and the fare information indicates a change of a ticket type, the card authorization terminal may change third attribute information of a tagged card, perform billing to the tagged card based on the changed third attribute information, and transmit the changed third attribute information of the tagged card to the management server. If the fare information includes information on an unusable card, the card authorization terminal may provide a warning message, a warning sound, or the like to prevent the use of the tagged card that is determined to be the unusable card.

Figure 5:
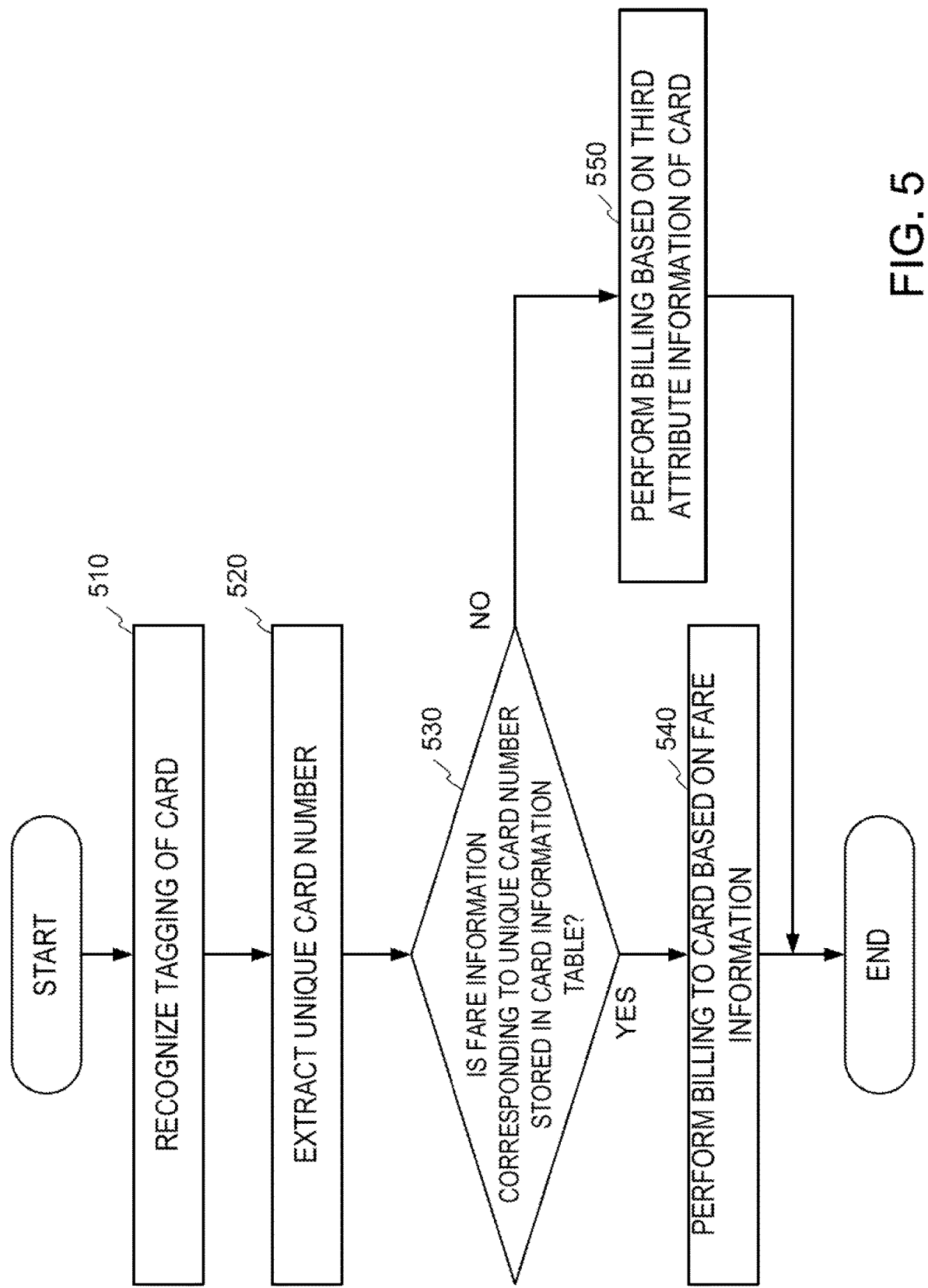
FIG. 5 is a flowchart illustrating a method of performing card authorization in a card authorization terminal according to an embodiment.

FIG. 5 is a flowchart illustrating a method of performing card authorization in a card authorization terminal according to an embodiment.

Referring to FIG. 5, when a card authorization terminal recognizes the tagging of a card at step 510, the card authorization terminal extracts a unique card number from the card at step 520.

At step 530, the card authorization terminal determines whether fare information corresponding to the unique card number is stored in a card information table therein. The card information table may store the unique card number of the card and fare information corresponding to the unique card number that the management server receives from a card issuer server.

As the determination result of step 530, if it is determined that the fare information corresponding to the unique card number is stored in the card information table, the card authorization terminal performs billing to the card based on the fare information at step 540.

On the other hand, if it is determined that the fare information corresponding to the unique card number is not stored in the card information table at step 530, the card authorization terminal performs billing to the card based on third attribute information of the card at step 550.

In some embodiments, the third attribute information of the card has been received from the card and stored in a storage device in the card authorization terminal, or is extracted from the card when the card is tagged on the card authorization terminal.

Figure 6:
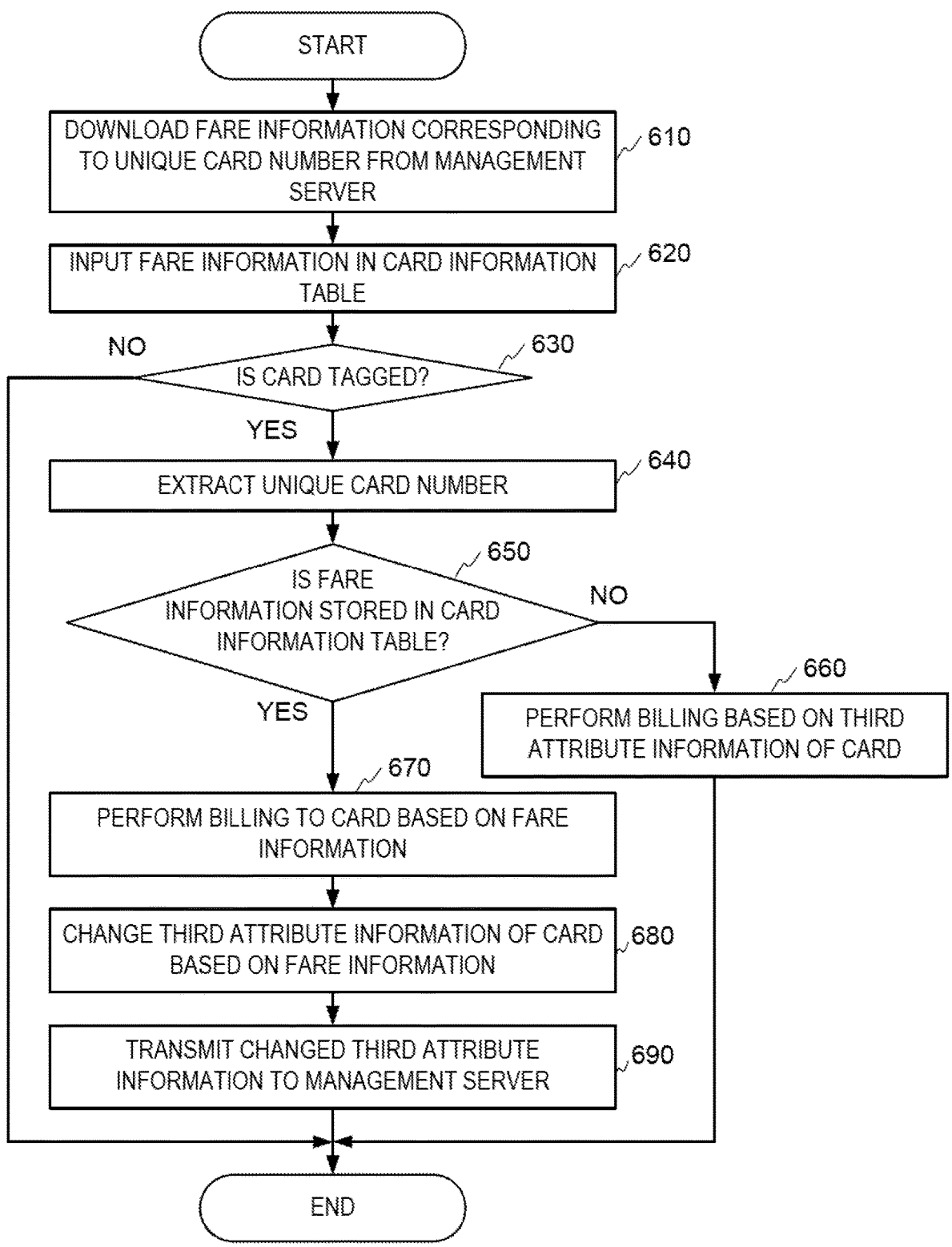
FIG. 6 is a flowchart illustrating a method of performing card authorization in a card authorization terminal according to another embodiment.

FIG. 6 is a flowchart illustrating a method of performing card authorization in a card authorization terminal according to another embodiment.

Referring to FIG. 6, at step 610, the card authorization terminal may download fare information corresponding to a unique card number of a card from a management server. The fare information may be generated based on a result of comparing first attribute information received from a card issuer server and second attribute information stored in a database of the management server. The first attribute information and the second attribute information may correspond to the unique card number.

At step 620, the card authorization terminal may input the downloaded fare information in a card information table at step 620.

At step 630, the card authorization terminal may determine if the card is tagged thereon.

If the card authorization terminal does not recognize the tagging of the card, the card authorization terminal may end the process. According to embodiments, when the tagging of the card is not recognized, the card authorization terminal may wait for a predetermined time or until the tagging of the card is recognized.

If the tagging of the card is recognized at step 630, the card authorization terminal may extract the unique card number from the card at step 640.

At step 650, the card authorization terminal may determine whether or not the fare information corresponding to the unique card number is stored in the card information table.

If it is determined that the fare information is not stored in the card information table, the card authorization terminal may perform billing to the card based on third attribute information of the card.

On the other hand, if it is determined that the fare information is stored in the card information table, the card authorization terminal may perform billing to the card based on the fare information.

When the fare information is used for the billing, the card authorization terminal may change the third attribute information of the card based on the fare information at step 680.

At step 690, the card authorization terminal may transmit the changed third attribute information to the management server.

Figure 7:
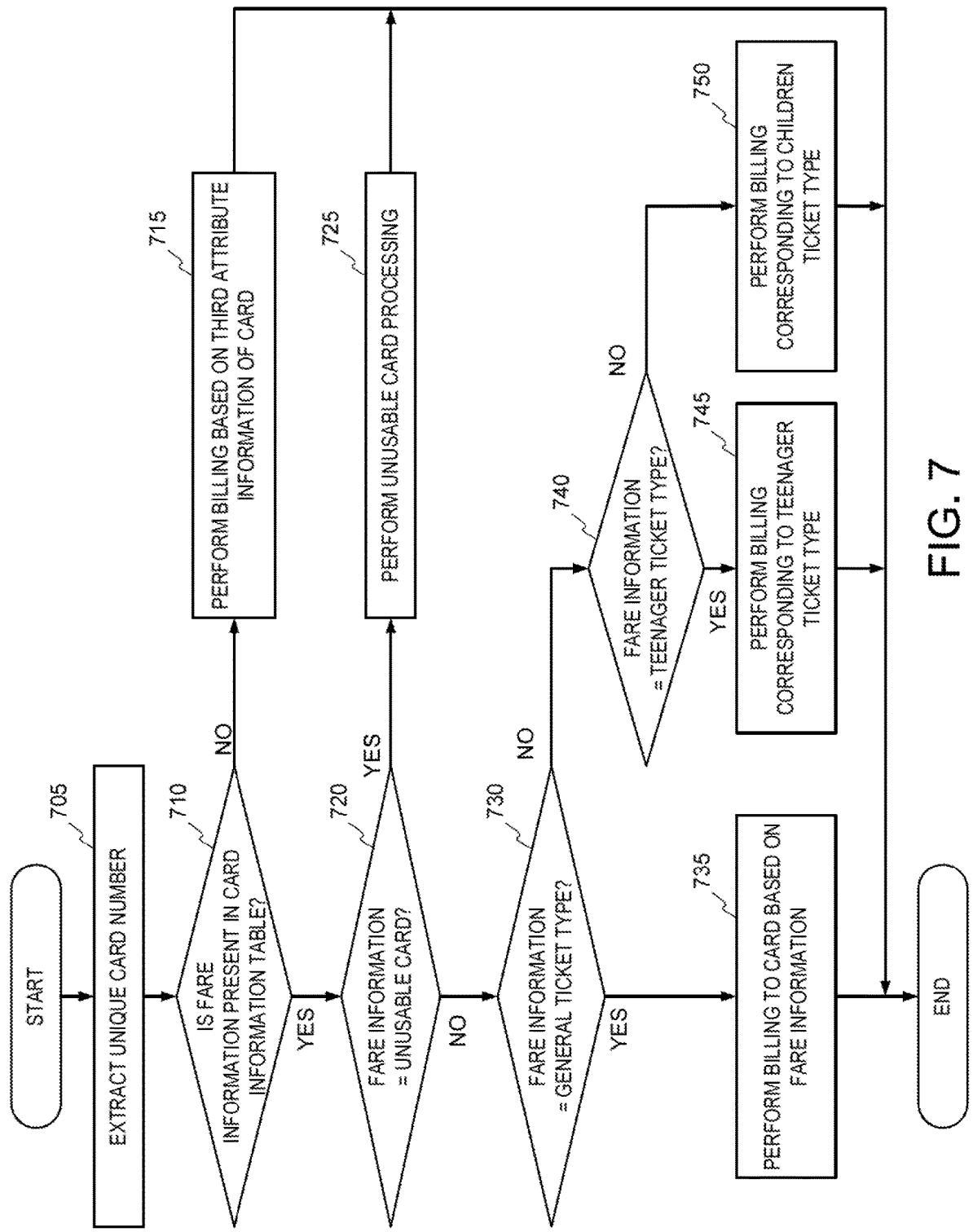
FIG. 7 is a flowchart illustrating a method of performing card authorization in a card authorization terminal according to still another embodiment.

FIG. 7 is a flowchart illustrating a method of performing card authorization in a card authorization terminal according to still another embodiment.

Referring to FIG. 7, if the tagging of a card is recognized, the card authorization terminal may extract a unique card number from the card at step 705.

At step 710, the card authorization terminal may determine whether fare information corresponding to the unique card number is present in a card information table.

If it is determined that the fare information corresponding to the unique card number is not present in the card information table, the card authorization terminal may perform billing to the card based on third attribute information stored in the card at step 715.

On the other hand, if it is determined that the fare information is present in the card information table, the card authorization terminal may determine whether or not the fare information corresponds to an unusable card at step 720.

If it is determined that the fare information corresponds to the unusable card, the card authorization terminal may perform 'unusable card' processing at step 725. Herein, examples of 'unusable card' processing may include displaying a warning message indicating that it is impossible to pay for a fare using the card, generating a warning sound, and the like.

On the other hand, if it is determined that the fare information does not correspond to the unusable card, the card authorization terminal may determine whether or not the fare information corresponds to a general ticket type at step 730.

If it is determined that the fare information corresponds to the general ticket type, the card authorization terminal may perform billing corresponding to the general ticket type. That is, a general fare is billed to the card.

On the other hand, if it is determined that the fare information does not correspond to the general ticket type, the card authorization terminal may determine whether or not the fare information corresponds to a teenager ticket type at step 740.

If it is determined that the fare information corresponds to the teenager ticket type, the card authorization terminal may perform billing corresponding to the teenager ticket type at step 745. That is, a teenager fare is billed to the card.

On the other hand, if it is determined that the fare information does not correspond to the teenager ticket type, the card authorization terminal may determine the fare information to correspond to a children ticket type and perform billing corresponding to the children ticket type at step 750. That is, a children fare is billed to the card.

Figure 8:
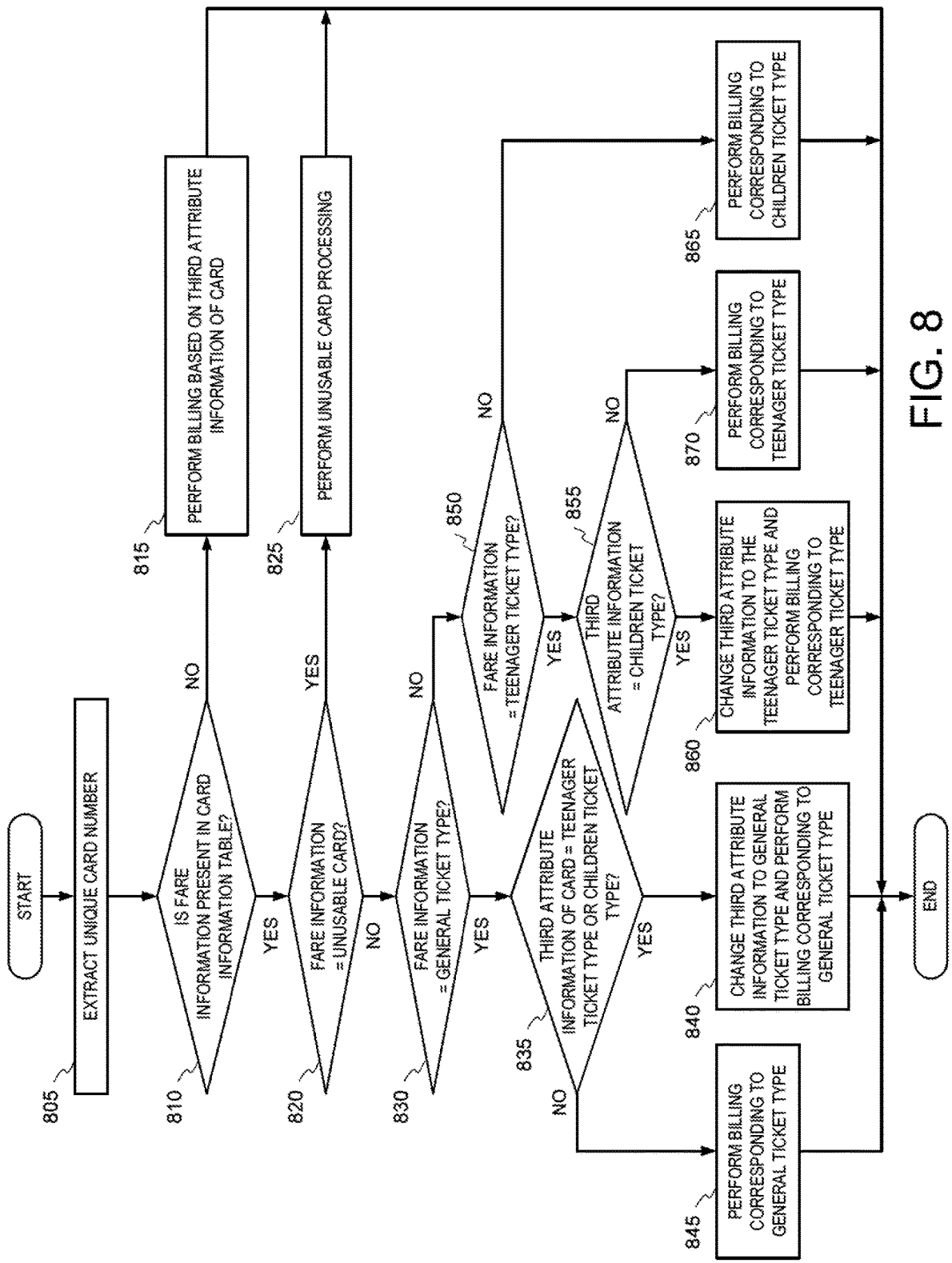
FIG. 8 is a flowchart illustrating a method of performing card authorization in a card authorization terminal according to further still another embodiment.

FIG. 8 is a flowchart illustrating a method of performing card authorization in a card authorization terminal according to still another embodiment.

Since processes of steps 805 to 830 in FIG. 8 are identical to the processes of steps 705 to 730 in FIG. 7, a description thereof will be omitted. Hereinafter, processes subsequent to step 830 will be described.

If it is determined that fare information of a card stored in a card information table of the card authorization terminal corresponds to a general ticket type at step 830, the card authorization terminal may determine whether or not third attribute information of the card corresponds to one of a teenager ticket type and a children ticket type at step 835.

If it is determined that the third attribute information of the card corresponds to one of the teenager ticket type and the children ticket type, the card authorization terminal may change the third attribute information of the card to the general ticket type, and perform billing corresponding to the general ticket type at step 840.

On the other hand, if it is determined that the third attribute information of the card does not correspond to one of the teenager ticket type and the children ticket type, the card authorization terminal may perform the billing corresponding to the general ticket type at step 845.

Meanwhile, if it is determined that the fare information does not correspond to the general ticket type at step 830, the card authorization terminal may determine whether or not the fare information corresponds to the teenager ticket type at step 850.

If it is determined that the fare information does not correspond to the teenager ticket type, the card authorization terminal may perform the billing corresponding to the children ticket type at step 865.

On the other hand, if it is determined that the fare information correspond to the teenager ticket type, the card authorization terminal may determine whether or not the third attribute information of the card corresponds to the children ticket type at step 855.

If it is determined that the third attribute information of the card corresponds to the children ticket type, the card authorization terminal may change the third attribute information of the card to the teenager ticket type, and perform the billing corresponding to the teenager ticket type at step 860.

On the other hand, if it is determined that the third attribute information of the card does not correspond to the children ticket type, the card authorization terminal may perform the billing corresponding to the teenager ticket type at step 870.

Figure 9:
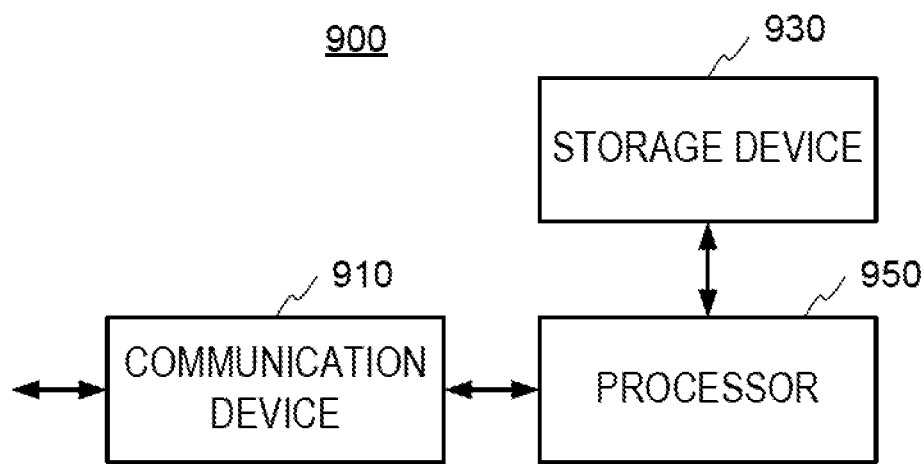
FIG. 9 is a block diagram of a management server according to an embodiment.

FIG. 9 is a block diagram of a management server according to an embodiment.

Referring to FIG. 9, the management server 900 includes a communication device 910, a storage device 930, and a processor 950.

The communication device 910 receives a unique card number of a card from a card authorization terminal when the card is tagged, and receives first attribute information corresponding to the unique card number of the card from a card issuer server.

The storage device 930 stores second attribute information corresponding to the unique card number of the card. For example, the storage device 930 may store the second attribute information of the card in a database that stores information of a card issuance ledger. The second attribute information may include at least one of an unusable card type, a general ticket type, a teenager ticket type, and a children ticket type.

The processor 950 compares the second attribute information of the card, which is extracted from the storage device 930, with the first attribute information of the card received from the card issuer server, and generates fare information for billing to the card based on the comparison result.

If a level of a ticket type in the first attribute information is higher than that of the second attribute information, the processor 950 may generate the fare information based on the ticket type in the first attribute information. On the other hand, if the ticket type level of the first attribute information is lower than or equal to that of the second attribute information, the processor 950 may exclude the ticket type of the first attribute information from a target for generating fare information, that is, the processor 950 does not generate fare information.

The communication device 910 may transmit the fare information to the card authorization terminal and then receive changed third attribute information of the card from the card authorization terminal. After that, the processor 950 may update the second attribute information of the card, which is stored in the database, based on the changed third attribute information received through the communication device 910.

Figure 10:
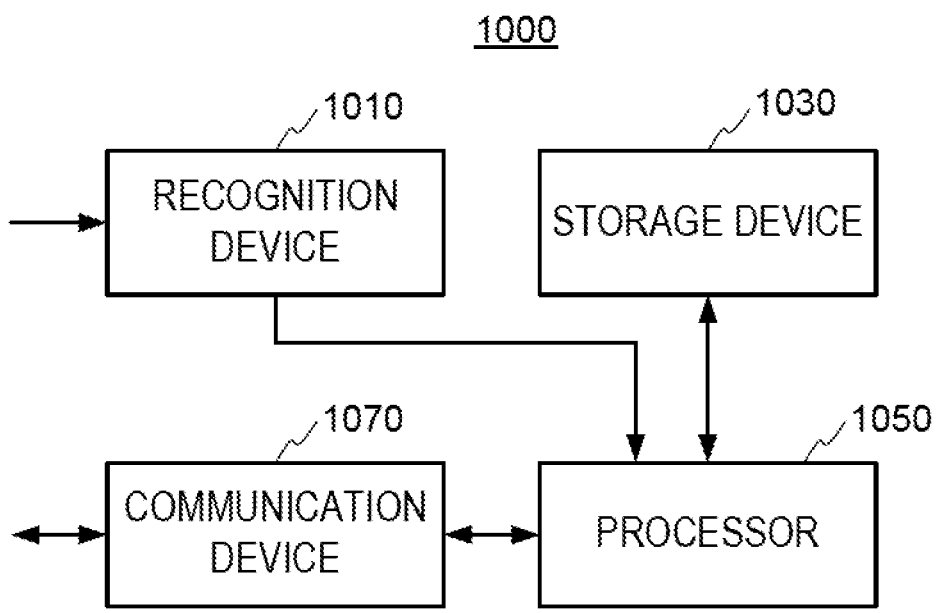
FIG. 10 is a block diagram of a card authorization terminal according to an embodiment.

FIG. 10 is a block diagram of a card authorization terminal according to an embodiment.

Referring to FIG. 10, the card authorization terminal 1000 includes a recognition device 1010, a storage device 1030, a processor 1050, and a communication device 1070.

The recognition device 1010 recognizes the tagging of a card. The recognition device 1010 may include a proximity sensor that can recognize the tagging of the card.

The storage device 1030 includes a card information table storing a unique card number of the card and fare information corresponding to the unique card number. The fare information may be generated based on a result of comparing first attribute information, which corresponds to the unique card number and is received from a card issuer server, and second attribute information, which corresponds to the unique card number and is stored in a database of a management server.

When the recognition device 1010 recognizes the tagging of the card, the processor 1050 extracts the unique card number from the card. The processor 1050 determines whether or not the fare information corresponding to the unique card number of the card is stored in the card information table of the storage device 1030. According to the determination result, the processor 1050 performs billing to the card based on one of the fare information and third attribute information of the card, which is extracted from the card.

If the fare information is not stored in the card information table, the processor 1050 performs the billing based on the third attribute information of the card. On the other hand, if the fare information is stored in the card information table, the processor 1050 performs the billing based on the fare information.

When the fare information is used for the billing, the processor 1050 may change the third attribute information of the card based on the fare information. At this time, the communication device 1070 may transmit the changed third attribute information of the card to a management server.

The processor 1050 may download the fare information corresponding to the unique card number of the card from the management server.

Methods according to embodiments of the present disclosure may be implemented in computer readable media. The computer readable media may store program commands, data files, data structures, or a combination thereof. Examples of the computer readable media may include magnetic media such as a hard disk, a floppy disk and a magnetic tape, optical media such as CD-ROM and DVD, magneto-optical media such as a floptical disk, and hardware devices such as ROM, RAM and flash memory, which are configured to store program commands executed by a processor. Examples of the program commands may include machine language codes created by a compiler and high-level language codes executed by a computer through an interpreter or the like. The hardware device may be configured to operate as one or more software modules to perform embodiments of the present disclosure.

While embodiments have been described in the present disclosure, it will be apparent to those skilled in the art that various changes and modifications may be made from the embodiments. For example, above-described methods may be performed in a different order from the above-described order, and/or the components of above-described systems, structures, devices, or circuits may be coupled or combined in a different manner from the above-described systems, structures, devices, or circuits, or replaced or substituted with other components or equivalents, and a proper result may be achieved.

Thus, the scope of the present invention may be defined by other implementations, other embodiments, the following claims and equivalents to the claims.

What is claimed is:

1. A method performed by a fare management system, the method comprising:

performing a first card reading of a card by a card reader of an authorization terminal, the card comprising a card number and a card storage configured to store a third fare level of the card;

responsive to the first card reading, performing, by the authorization terminal, a first extraction of the card number from the card;

responsive to the first extraction, determining that a second fare level corresponding to the card number does not exist in a card information table of the authorization terminal and in response reducing, by the authorization terminal, a fare amount stored in the card according to the third fare level stored in the card;

storing, by the authorization terminal, into the card information table, the third fare level from the card obtained by the first card reading;

performing a second card reading of the card by the card reader of the authorization terminal, and responsive thereto, performing a second extraction of the card number from the card;

responsive to the second extraction of the card number, determining, by the authorization terminal, that a fare level for the second-extracted card number exists in the card information table, and based thereon, sending the second-extracted card number to a management server;

receiving, by the management server, the second-extracted card number, and in response, by the management server:

receiving a first fare level from a card-issuer server operated by an issuer of the card, and in response storing, by the management server, in a memory of the management server, the first fare level of the card in association with the card number;

based on the received second-extracted card number, obtaining the second fare level from a database; and determining that the first fare level in the memory of the management server is higher than the obtained second fare level and based thereon sending the first fare level in the memory of the management server to the authorization terminal;

responsive to receiving the first fare level from the management server, storing the first fare level in the card information table and reducing, by the authorization terminal, the fare amount stored in the card according to the first fare level, wherein based on the authorization terminal storing the first fare level in the card information table the authorization terminal instructs the management server to update its second fare level with the first fare level received by the authorization terminal;

performing a third card reading of the card by the card reader of the authorization terminal, and responsive thereto, performing a third extraction of the card number from the card;

responsive to the third extraction of the card number, determining, by the authorization terminal, that the fare level for the second-extracted card number exists in the card information table, and based thereon, sending the third-extracted card number to the management server;

receiving, by the management server, the third-extracted card number, and in response, by the management server:

receiving a new first fare level from the card issuer server, and in response storing, by the management server, in the memory of the management server, the new first fare level in association with the card number;

based on the received third-extracted card number, obtaining the second fare level from the database; and determining that the new first fare level in the memory of the management server is not higher than the obtained second fare level and based thereon not responding to the authorization terminal's transmission of the third-extracted card number, wherein, in association with the third card reading, the authorization terminal reduces the fare amount in the card using the card information table.

2. A method according to claim 1, further comprising transmitting, by the authorization terminal, a result of reducing the fare amount to the management server.

3. A method according to claim 1, wherein, the second fare level corresponds to an unusable ticket type, and wherein the method further comprises generating, by the management server, an indication that the card is unusable, and transmitting, by the management server, the indication to the authorization terminal.

4. A method according to claim 1, wherein the management server and the card-issuer server comprise separate respective server devices.

5. A method according to claim 1, wherein the authorization terminal and the management server comprise separate respective server devices.

6. A method performed by a fare management system, the method comprising:

performing a first card-reading of a card by a card reader of an authorization terminal, the card comprising a card number and a card storage configured to store a fare level of the card, the first card-reading comprising a first-extraction of the card number from the card;

responsive to the first-extraction, determining that a fare level corresponding to the card number does not exist in a card information table of the authorization terminal, and in response reducing, by the authorization terminal, a fare amount stored in the card;

storing, by the authorization terminal, into the card information table, the fare level obtained from the card by the first card-reading;

performing a second card-reading of the card by the card reader of the authorization terminal, the second card-reading comprising a second-extraction of the card number from the card;

responsive to the second-extraction of the card number, determining, by the authorization terminal, that a fare level for the second-extracted card number exists in the card information table, and based thereon, sending the second-extracted card number to a management server;

receiving a fare level from a card-issuer server operated by an issuer of a fare card, and storing, by the management server, into a memory of the management server, the fare level from the card-issuer server in association with the card number;

receiving, by the management server, the second-extracted card number, and in response, by the management server:

based on the received second-extracted card number, obtaining a fare level from a database;

determining that the fare level in the memory is higher than the fare level obtained from the database, and based thereon sending the fare level in the memory to the authorization terminal;

receiving and storing the fare level from the memory into the card information table and reducing, by the authorization terminal, the fare amount stored in the card according to the fare level stored in the card information table, wherein, based on the authorization terminal storing the fare level from the memory into the card, the authorization terminal instructs the management server to update the fare level in the database with the fare level received by the authorization terminal from the memory;

performing a third card-reading of the card by the card reader, the third card-reading comprising a third-extraction of the card number from the card;

responsive to the third-extraction of the card number, determining, by the authorization terminal, that the fare level for the second-extracted card number exists in the card information table, and based thereon, sending the third-extracted card number to the management server;

receiving, by the management server, the third-extracted card number, and in response, by the management server:

based on the received third-extracted card number, obtaining the fare level from the database; and determining that the fare level in the memory of the management server is not higher than the fare level obtained from the database, and based thereon not responding to the authorization terminal's transmission of the third-extracted card number, wherein, in association with the third card-reading, the authorization terminal reduces the fare amount in the card using the card information table.

7. A method according to claim 6, further comprising receiving a new fare level from the card-issuer server, and in response storing, by the management server, in the memory, the new fare level in association with the card number.

8. A method according to claim 6, further comprising transmitting, by the card authorization terminal, a result of reducing the fare amount to the management server.

9. A method according to claim 6, wherein, the fare level from the database corresponds to an unusable ticket type, and wherein the method further comprises generating, by the management server, an indication that the card is unusable, and transmitting, by the management server, the indication to the card authorization terminal.

10. A method according to claim 6, wherein the management server and the card-issuer server comprise separate respective server devices.

11. A method according to claim 6, wherein the authorization terminal and the management server comprise separate respective server devices.

* * * * *